Dec. 27, 1927.
S. A. L. CAMPAGNE
1,653,984
VEHICLE TRAFFIC SIGNAL
Filed Aug. 24, 1927
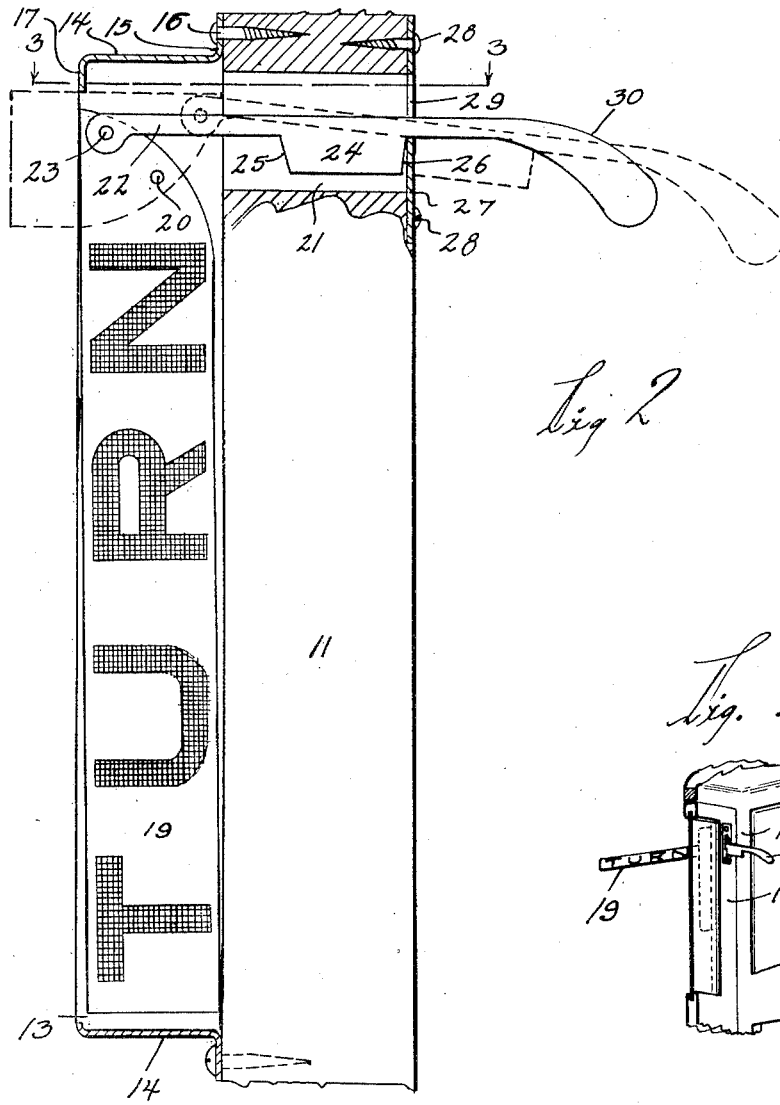
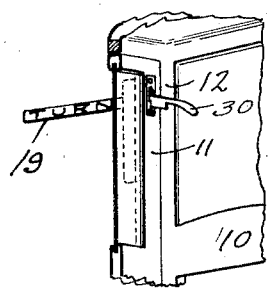
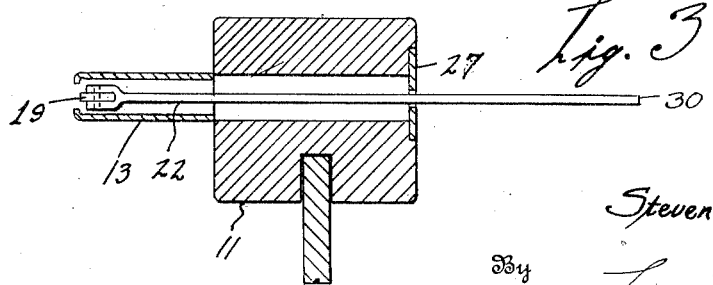
Inventor
Steven A. L. Campagne
By Lynn H. Latta
Attorney Patented Dec. 27, 1927.

1,653,984

UNITED STATES PATENT OFFICE.

STEVEN A. L. CAMPAGNE, OF SIOUX CENTER, IOWA.

VEHICLE TRAFFIC SIGNAL.

Application filed August 24, 1927. Serial No. 215,133.

My invention relates to vehicle traffic signals and it is my object to provide a signal of the type which may be attached to a post of the body of a closed vehicle with the operating mechanism extending through the post.

More particularly it is my object to provide a signal of the above type and embodying a pivoted signal arm adapted to be raised from depending vertical position to a substantially horizontal position.

My invention consists in the arrangement of the signal arm, a casing to inclose the arm when in inoperative position, and an operating element comprising a single piece formed to combine the functions of locking the signal arm in either extended or inoperative position. The object of the latter function is to prevent the signal arm from swinging under the impulse of the swaying of the vehicle on which it is installed.

A further object of my invention is to accomplish the foregoing objects in the most simple, economical and effective manner, whereby an inexpensive and durable article may be produced.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a perspective view taken from the inside of a portion of one corner of a vehicle body illustrating my invention attached thereto.

Fig. 2 is a detail, sectional view taken longitudinally through the signal casing, a portion of the body being shown in section and a portion in elevation.

Fig. 3 is a transverse, sectional view taken on the line 3—3 of Fig. 2.

An objection to many of the traffic signals which have been devised for use in connection with automotive vehicles is that they have been too complicated and, being too complicated, are so expensive of manufacture that the public cannot benefit from them. The signal, which it is most important to give to the traffic behind a vehicle is that of "Turn" where the driver intends to make a left turn. For this purpose it has been customary to employ signals embodying a swinging arm adapted to move to a horizontal position projecting outwardly from the left side of the vehicle. The usual "stop light" signal has been found very satisfactory in warning the traffic behind of the intention of a driver to slow down or to stop.

The popularity of the inclosed vehicle has made it necessary to devise a signal wherein the actuating mechanism can be extended through a portion of the body of the vehicle, so as to be accessible from within. The most effective method of mounting the arm is to pivot it on an axis parallel with the longitudinal axis of the vehicle on the left hand side of the body so that it may swing from a depending position to a horizontally extended position. It is desirable to protect the signal arm from the weather and to hide it when in its inoperative position, and for this purpose it is desirable to encase the arm in a casing when in its depending position. It is also desirable to lock it in its depending position so that it will not swing from the casing. I have accomplished these results by a simple actuating mechanism extending into the vehicle as embodied in the mechanism which I will now describe.

I have used the reference character 10 to indicate generally the body of an inclosed vehicle and the reference character 11 to indicate a vertical post of one of the doors of that vehicle. I have shown the invention attached to the door, although it will be understood that it might be attached to the windshield post 12 in many cases.

The casing of the signal comprises mainly a pair of side walls 13. (See Fig. 3.) The casing may be formed of a longitudinally slotted strip of wood or may be formed of sheet metal, as shown in the drawings. In employing a sheet metal construction, the casing is made channel-shaped, as shown, and includes the side walls 13, the end walls 14 and attaching ears 15, which are formed as continuations of end walls 14, bent upwardly and downwardly in the plan of the inner edges of the side walls 13. Screws 16 may be employed to secure the ears 15 to the post 11. The connecting wall 17, between the walls 13, is mostly cut away to form a slot 18 extending practically the entire length of the casing.

The edge of the wall 17 limiting the upper extremity of the slot 18 acts as a stop for the signal arm as will later be seen.

The signal arm may be formed of a thin strip of wood or metal 19 and is pivoted upon a rivet or the like 20, positioned somewhat below the upper wall 14. The pivot 20 is spaced inwardly from the end of the signal arm 18 and is spaced preferably nearer the inner edge than the outer edge in order that the proper leverage may be attained by the actuating device when the signal arm is in its horizontal position. This will be more thoroughly explained hereinafter. A slot 21 is extended through the post 11 before the attachment of the casing and the casing is attached with its upper wall 14 substantially registering with the upper extremity of the slot 21.

The actuating element comprises a lever 22, which is pivoted at one end by an element 23 to the signal arm 19. The pivot 23 is positioned as close to the outer edge of the arm 19 as possible and is spaced upwardly from the rivet 20 substantially the same distance as it is spaced outwardly therefrom. That is, when the signal is in its depending position, the pivot 23 will light above and to one side of the pivot 20 at an angle of approximately 45° to the horizontal.

The lever 22 has a latch element 24 formed integrally therewith and extending downwardly from the lever proper so as to form the two latching shoulders 25 and 26. A keeper 27 is secured to the post 11 on its inner face by means of screws or the like 28 and is provided with a slot 29 of sufficient height to receive the latch portion 24. The upper extremity of the slot 29 will normally be positioned substantially registering with the upper extremity of the slot 21. The pivot 20 is positioned below the wall 14 sufficiently to bring the lever 22 to a substantially horizontal position when it is in the position shown in Fig. 2 in full lines. A handle 30 forms the inner extremity of the lever 22.

The upper extremity of the slot 18 is so positioned relative to the pivot 20 that when the arm 19 has been swung to horizontal position, the edge of the arm will just engage the wall 17.

The shoulders 25 and 26 are so spaced from the pivot 23 that when the lever is in depending position the shoulder 26 will just clear the edge of the keeper 27 and be received against the inner face thereof, whereas when the arm is in horizontal position, the shoulder 25 will just clear the edge of the keeper and be received against the outer face thereof, as shown in dotted lines in Fig. 2. In either position, it will be noted that the weight of the lever will maintain the latch device in locking position. The weight of the lever will be attained by the pull of the arm 19, tending to urge the latch device against the keeper when the arm is in extended position and when the arm is in depending position, it will engage the post 11 to prevent movement of the locking device in an outward direction. The parts are so arranged so that a little pressure is necessary to force the latch member downwardly behind the keeper when the arm is in depending position.

It will now be seen that by lifting upon the handle 30, the latch device may be released from engagement with the keeper so as to pass through the slot 29 and that by pulling inwardly upon the lever the arm 19 will be caused to raise to its horizontal position. To release the signal, it is only necessary to impart a blow upwardly against the handle 30 and the signal will drop to normal position. The signal may then be locked in its normal position at the pleasure of the operator.

The device comprises a minimum movement of parts of the simplest design and can be produced very economically. Other advantages are apparent from the preceding description. The engagement of the signal arm against the casing wall at the upper extremity of the slot serves to prevent the arm jolting vertically under the vibration of the vehicle when it is in horizontal position.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a vehicle traffic signal, in combination with a vertical wall portion of a vehicle, a casing secured to the outer faces of said wall portion, said casing comprising side walls delimiting between them a slot, a keeper secured to the inner face thereof and having a slot, the upper extremity of which is substantially level with the upper extremity of the slot in the casing, the wall portion being provided with a slot covered by the keeper and extending to the casing, a signal arm pendantly pivoted intermediate its length in said casing to form short and long arm portions, and a lever pivoted to the short arm portion at a point substantially equidistant in directions upwardly and outwardly from the fulcrum of the arm when the latter is in depending position, said lever extending through the keeper slot to the interior of the vehicle to form a handle, and being provided with an integral downwardly extending latch element forming two opposed shoulders adapted to engage the opposite sides of the keeper when the lever is lowered, and to pass through the keeper slot when the lever is raised.

2. In a vehicle traffic signal, in combination with a vertical wall portion of a vehicle, means secured to the outer face of the wall portion to support a signal arm, a slotted keeper secured to the inner face of the wall portion opposite said means, the wall portion being provided with a slot covered by the keeper and extending through the wall portion, a signal arm pendantly pivoted intermediate its length in said means, to form short and long arm portions, and a lever pivoted to the short arm portion at a point substantially equidistant in directions upwardly and outwardly from the fulcrum of the arm when the latter is in depending position, said lever extending through the keeper slot to the interior of the vehicle to form a handle, and being provided with an integral downwardly extending latch element adapted to engage the keeper when the lever is lowered, and to pass through the keeper slot when the lever is raised.

3. In a vehicle traffic signal, in combination with a vertical wall portion of a vehicle, means secured to the outer face of the wall portion to support a signal arm, a slotted keeper secured to the inner face of the wall portion opposite said means, the wall portion being provided with a slot covered by the keeper and extending through the wall portion, a signal arm pendantly pivoted intermediate its length in said means, to form short and long arm portions, and a lever pivoted to the short arm portion at a point substantially equidistant in directions upwardly and outwardly from the fulcrum of the arm when the latter is in depending position, said lever extending through the keeper slot to the interior of the vehicle to form a handle, and being provided with an integral downwardly extending latch element forming two opposed shoulders adapted to engage the opposite sides of the keeper when the lever is lowered, and to pass through the keeper slot when the lever is raised.

4. In a vehicle traffic signal, in combination with a vertical wall portion of a vehicle, a casing secured to the outer face of said wall portion, said casing comprising side walls delimiting between them a slot, a keeper secured to the inner face thereof and having a slot, the upper extremity of which is substantially level with the upper extremity of the slot in the casing, the wall portion being provided with a slot covered by the keeper and extending to the casing, a signal arm pendantly pivoted intermediate its length in said casing to form short and long arm portions, and a lever pivoted to the short arm portion at a point substantially equidistant in directions upwardly and outwardly from the fulcrum of the arm when the latter is in depending position, said lever extending through the keeper slot to the interior of the vehicle to form a handle, and being provided with an integral downwardly extending latch element adapted to engage the keeper when the lever is lowered, and to pass through the keeper slot when the lever is raised, the casing wall at the upper limit of the slot therein, being positioned to engage the signal arm when the latter is in an extended horizontal position.

5. In a vehicle traffic signal, in combination with a vertical wall portion of a vehicle, means secured to the outer face of the wall portion to support a signal arm, a slotted keeper secured to the inner face of the wall portion opposite said means, the wall portion being provided with a slot covered by the keeper and extending through the wall portion, a signal arm pendantly pivoted intermediate its length in said means, to form short and long arm portions, and a lever pivoted to the short arm portion at a point substantially equidistant in directions upwardly and outwardly from the fulcrum of the arm when the latter is in depending position, said lever extending through the keeper slot to the interior of the vehicle to form a handle, and being provided with an integral downwardly extending latch element adapted to engage the keeper when the lever is lowered, and to pass through the keeper slot when the lever is raised, and means to engage said signal arm when the latter is in an extended horizontal position, to limit the arm against further upward movement.

Signed this 19th day of August, 1927, in the county of Woodburg and State of Iowa.

STEVEN A. L. CAMPAGNE.